(No Model.)

E. J. MOLERA & J. C. CEBRIAN.
SECONDARY BATTERY.

No. 292,034. Patented Jan. 15, 1884.

WITNESSES
George W. Cook
S. G. Nottingham

INVENTORS
E. J. Molera
J. C. Cebrian
Attorney

UNITED STATES PATENT OFFICE.

EUSEBIUS J. MOLERA AND JOHN C. CEBRIAN, OF SAN FRANCISCO, CALIFORNIA; SAID MOLERA ASSIGNOR TO SAID CEBRIAN.

SECONDARY BATTERY.

SPECIFICATION forming part of Letters Patent No. 292,084, dated January 15, 1884.

Application filed February 23, 1883. (No model.)

*To all whom it may concern:*

Be it known that we, EUSEBIUS J. MOLERA and JOHN C. CEBRIAN, of San Francisco, in the county of San Francisco and State of California, have invented certain new and useful Improvements in Secondary Batteries; and we do hereby declare the following to be a full, clear, and exact description of the invention, such as will enable others skilled in the art to which it pertains to make and use the same.

Our invention relates to an improvement in secondary batteries, the object being to provide a secondary battery box or receptacle which shall be of light weight, economical in construction, and adapted to withstand the action of the battery-fluid. A further object is to provide a secondary battery with a commutator constructed and arranged so that all the elements may be connected in quantity or tension, or part of the electrodes may be coupled in quantity and the remainder in tension.

With these ends in view our invention consists in certain features in construction and combinations of parts, as will be hereinafter described, and pointed out in the claims.

Figure 1:
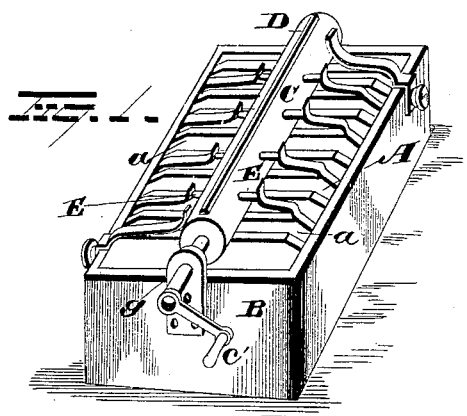
Figure 2:
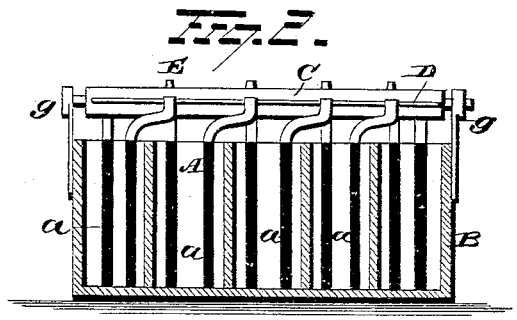
Figure 5:
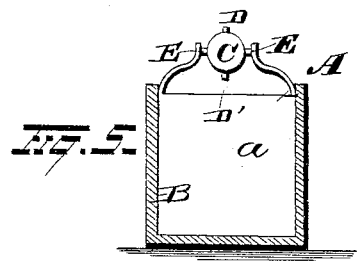
Figure 3:
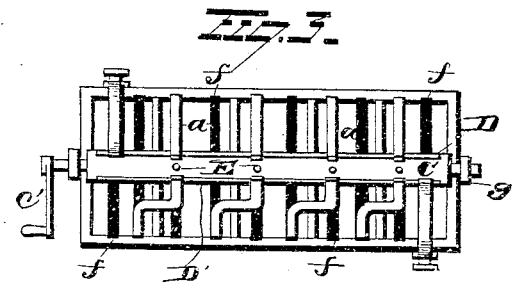
Figure 6:
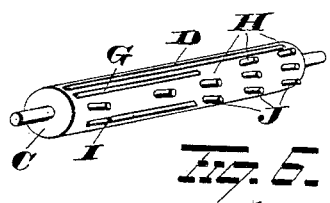
Figure 4:
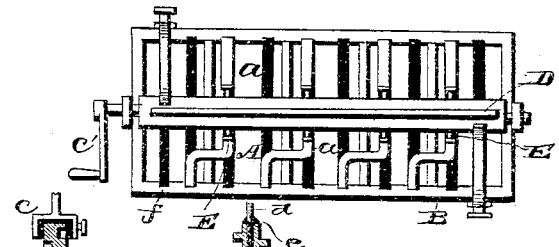

In the accompanying drawings, Figure 1 is a view in perspective of our improved secondary battery. Fig. 2 is a longitudinal section. Fig. 3 is a plan view, showing the commutator adjusted to couple the electrodes in quantity. Fig. 4 shows the electrodes coupled in tension. Fig. 5 is a transverse section. Fig. 6 is a view in perspective of the commutator.

Figure 7:
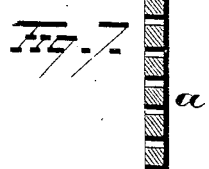
Figures 8, 9:
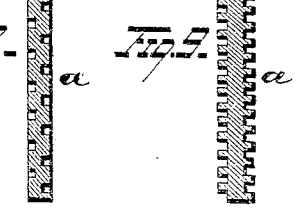

A represents the electrodes, the body or support $a$ of which is made of carbon. We may use powdered or pulverized carbon and mix therewith some binder, as saccharine matter, forming a paste, and by molding and baking the same produce a carbon support of any desired shape and size; or, we take wooden slabs or pieces and carbonize them in a retort; or, carbonized pasteboard or paper-pulp or vegetable fiber may be used in making the supports $a$. By making the supports $a$ of carbon they are of light weight, of good electrical conductivity, of a surface and texture adapted to insure the close and firm adhesion of a coating of oxide to them, strong and stiff, and thereby rendered durable and efficient in use, and of comparative small initial cost. These carbon supports $a$ may be perforated, as shown in Fig. 7; or they may be formed with recesses, as shown in Fig. 8, or with ribbed surfaces, as represented in Fig. 9, or they may be made of any other desired shape. These supports are then provided with a coating of oxide of lead, which may be applied mechanically in the form of red lead or any other suitable form of lead oxide, and by suitable compression caused to adhere to the surface of the carbon. Plates thus made are then placed in a receptacle containing dilute sulphuric acid and subjected to the well-known electrical "forming" process and then associated together and connected up in pairs in a battery, and, when charged by an electrical current, will have electric energy stored therein; or, a coating of lead may be produced on the carbon supports by electrical deposition, and the plates electrically formed by the well-known Planté process.

In order to establish a good electrical connection with the electrodes, we may have an electro-deposit, $b$, (shown in Fig. 7,) or any portion of the electrode on which deposit may be soldered or otherwise secured a metal band or clasp, $c$; or, we may work into the electrode during its manufacture a copper strip or wire, $d$, as shown in Fig. 9, and make an electro-deposit, $e$, of copper around the junction of the strip or wire and the carbon.

B represents the box or receptacle for the battery-fluid. We prefer to make the box as follows: We first make the box of paper, wood, metal, asbestus, or other suitable material. On the inner or both inner and outer surfaces of the box we apply a coating made as follows: We take gelatine and mix it with bichromate of potash and apply the mixture to the box as a coating. The operation of mixing and applying the coating is carried on in the dark. Then by the exposure of the box thus coated to the light the coating is rendered insoluble and forms a perfectly durable liquid-tight surfacing, which is not affected by the battery-fluid.

The boxes B may be provided with slots $f$ in their sides, for the reception and retention of the electrodes, as illustrated in Fig. 3, or they may be separated by thin diaphragms of porous earth, of carbon, of paper, or cloth; or the coating of oxide of lead may be applied to one side only of the carbon plate and the electrodes placed close to each other, the coated side of one plate being placed adjacent to the naked side of the next plate. The pairs may consist of two single plates or of any desired number of plates separated from each other, but coupled, so as to constitute, practically, but two electrodes. The box B is provided at each end with a bearing, $g$, in which is journaled the rotary commutator C, which is made of wood, glass, or other insulating material, and provided with a handle, C', for its rotary adjustment.

On opposite sides of the commutator are secured the long metallic strips D D'. The commutator can be turned, as represented in Fig. 3, so that the contact-strips of all the positive electrodes will be in contact with one of the strips, and all of the strips of the negative electrodes with the other strip, and thus the elements of the battery are coupled in quantity; also, the commutator-bar is provided with a series of metallic pins, E, that extend through the commutator and project outwardly from its sides, and hence by turning the commutator-bar so that the contact-strips of all of the positive electrodes connect with the ends of the pins on one side of the commutator-bar and the contact-strips of all the negative electrodes connect with the opposite ends of the pins, the electrodes will be coupled in tension.

In Fig. 4 the electrodes are shown as coupled in tension, the current passing from the electrode at the left of the box, through the battery-fluid to the adjacent plate, from thence through the contact-strip to the commutator-pin, through the same to the contact-strip of the next electrode, and through the same and battery-fluid to the next electrode, and so on to the opposite pole of the battery. The commutator-bar is also provided on opposite sides with the strips G G', and then with the pins H H in line therewith, whereby three of the cells may be coupled in quantity and two in tension. This is accomplished by rotating the commutator-bar until the contact-strips of three pair of electrodes will engage with the strips G G' on opposite sides of the commutator, thus coupling the three pair of electrodes in quantity. The contact-strips of the other two pairs of electrodes engage with the pins H H, and whereby they are coupled in tension. Also, the commutator-bar is provided with the strips I I and three pins, J, to allow two of the cells to be coupled in quantity and three in tension.

Commutators substantially like the one shown and described may extend over several separate batteries, each composed of any desired number of cells, and be arranged to connect them in quantity or tension by acting on the two end electrodes of each cell in the same way that it connects the electrodes of a single battery.

We make no claim in the application to the construction of the box or receptacle for the battery-fluids shown and described, but reserve the right to claim the same in a future application.

It is evident that many changes in the form, material, construction, and relative arrangement of parts might be resorted to without departing from the spirit of our invention, and hence we would have it understood that we do not limit ourselves to the particular construction, form, material, or relative arrangement of parts shown and described; but, Having fully described our invention, what we claim as new, and desire to secure by Letters Patent, is—

The combination, with the electrodes of a secondary battery, each electrode being provided with a copper strip, as described, of a revolving commutator made of non-conducting material, and having metallic pins and strips disposed longitudinally upon its periphery, and respectively arranged to connect part of the electrodes for tension and part for quantity, substantially as set forth.

In testimony whereof we have signed this specification in the presence of two subscribing witnesses.

EUSEBIUS J. MOLERA.
JOHN C. CEBRIAN.

Witnesses to signature of E. J. Molera:
  GEORGE COOK,
  FRANK O. MCCLEARY.

Witnesses to signature of J. C. Cebrian:
  P. C. WEGENER,
  LOUIS PROLL, Jr.